United States Patent
Hsu

(10) Patent No.: US 11,308,080 B2
(45) Date of Patent: Apr. 19, 2022

(54) FUNCTION MANAGEMENT METHOD AND MEMORY DEVICE

(71) Applicant: Silicon Motion, Inc., Jhubei (TW)

(72) Inventor: Kuo-Chiang Hsu, Hsinchu (TW)

(73) Assignee: Silicon Motion, Inc., Jhubei (TW)

( * ) Notice: Subject to any disclaimer, the term of this patent is extended or adjusted under 35 U.S.C. 154(b) by 67 days.

(21) Appl. No.: 15/346,184

(22) Filed: Nov. 8, 2016

(65) Prior Publication Data

US 2017/0262322 A1  Sep. 14, 2017

(30) Foreign Application Priority Data

Mar. 8, 2016 (TW) .................................. 105106994

(51) Int. Cl.
*G06F 16/24* (2019.01)
*G06F 8/41* (2018.01)

(52) U.S. Cl.
CPC .............. *G06F 16/24* (2019.01); *G06F 8/427* (2013.01)

(58) Field of Classification Search
None
See application file for complete search history.

(56) References Cited

U.S. PATENT DOCUMENTS

| | | | | |
|---|---|---|---|---|
| 8,904,358 | B1 * | 12/2014 | Peri-Glass | G06F 11/3608 717/126 |
| 9,158,604 | B1 * | 10/2015 | Christodorescu | G06F 9/54 |
| 9,629,012 | B2 | 4/2017 | Van Den Bogaert | |
| 2002/0133809 | A1 | 9/2002 | Hills | |
| 2005/0204368 | A1 * | 9/2005 | Ambekar | G06F 9/541 719/328 |
| 2006/0020918 | A1 * | 1/2006 | Mosberger | G06F 11/3409 717/124 |
| 2007/0150881 | A1 * | 6/2007 | Khawand | G06F 11/3409 717/162 |
| 2011/0029551 | A1 | 2/2011 | Chen et al. | |
| 2012/0069748 | A1 * | 3/2012 | Van Den Bogaert | H04W 24/10 370/252 |

FOREIGN PATENT DOCUMENTS

| | | |
|---|---|---|
| CN | 103577324 A | 2/2014 |
| CN | 103824020 A | 5/2014 |
| TW | 200903251 A | 1/2009 |

OTHER PUBLICATIONS

Office Action of corresponding TW application, published on Nov. 1, 2016.

* cited by examiner

*Primary Examiner* — Chat C Do
*Assistant Examiner* — William C Wood
(74) *Attorney, Agent, or Firm* — Wang Law Firm, Inc.

(57) ABSTRACT

A function management method applied to a memory device includes obtaining a plurality of functions through a map file of a compiler, and parsing at least one source code of the memory device with the map file. The functions include at least one normal function and at least one API function. The parsing includes developing a mapping relationship between the at least one API function and the at least one normal function, and developing a calling relationship between the at least one normal function.

8 Claims, 6 Drawing Sheets

Normal Function Database

| index | name |
|---|---|
| 122 | ISP_NF_FTL_Cleanpart2n3 |
| 123 | ISP_NF_FTL_Erase_Trim |
| 124 | ISP_NF_FTL_Erase_Trim_ModeEntry |
| 125 | ISP_NF_FTL_LoadBadBit_BuildList |
| 126 | ISP_NF_FTL_LoadDiffBlock_BuildList |

| calling | called | alter... | option |
|---|---|---|---|
| 3 | 6 | 1 | 0 |
| 0 | 9 | 1 | 1 |
| 1 | 7 | -1 | 1 |
| 1 | 2 | -1 | 0 |
| 1 | 2 | -1 | 0 |

Mapping Relationship Database

| index | name | f-index |
|---|---|---|
| 0 | API_NF_FTL_ReportExe | 128 |
| 1 | API_NF_FTL_ReportExe | 130 |
| 2 | API_NF_FTL_ReportExe | 129 |
| 3 | API_NF_FTL_ReportExe | 139 |
| 4 | API_NF_PFTL_Read_SysPage_Retry | 210 |

API function database

| index | name | option |
|---|---|---|
| 0 | API_CTL_ErrHandle | 0 |
| 1 | API_CTL_FuncSel | 0 |
| 2 | API_CTL_GetRegister | 0 |
| 3 | API_CTL_SWAP_FuncSel | 0 |
| 4 | API_CTL_SetRegister | 0 |

Calling Relationship Database

| index | calling | called |
|---|---|---|
| 0 | 138 | 113 |
| 1 | 138 | 110 |
| 2 | 105 | 103 |
| 3 | 629 | 979 |
| 4 | 629 | 105 |
| 5 | 629 | 93 |
| 6 | 629 | 91 |
| 7 | 629 | 92 |
| 8 | 112 | 629 |
| 9 | 114 | 234 |
| 10 | 114 | 219 |
| 11 | 146 | 162 |
| 12 | 146 | 979 |
| 13 | 145 | 162 |
| 14 | 145 | 339 |
| 15 | 145 | 1002 |
| 16 | 145 | 979 |
| 17 | 145 | 3 |
| 18 | 145 | 103 |
| 19 | 147 | 162 |

FUNCTION MANAGEMENT METHOD AND MEMORY DEVICE

CROSS REFERENCE TO RELATED APPLICATIONS

This application claims priority of Taiwan Patent Application No. 105106994 filed on Mar. 8, 2016, the entirety of which is incorporated by reference herein.

BACKGROUND OF THE INVENTION

Field of the Invention

The disclosure generally relates to a function management method and a memory device, and more particularly, to a function management method and a memory device which could analyze the mapping relationship between normal functions and API functions, and the calling relationship between normal functions.

Description of the Related Art

Many internal stored programs (ISPs) are stored in the memory device generally. ISPs for different functional modules are usually stored in a memory. When a functional module is utilized by users, the program codes of the ISP of the above functional module will be loaded to the memory in order to execute the loaded program codes and assign the normal function which is mapped to the application programing interface (API) function. However, when the API function is executed by the memory device, the current function management method cannot directly analyze the calling relationship of the normal functions of the ISP through the API functions, and the reading/writing performance of the memory device deteriorates accordingly. Therefore, a function management method is needed to analyze the mapping relationship between normal functions and API functions and the calling relationship between normal functions, in order to improve the performance of the memory device.

BRIEF SUMMARY OF THE INVENTION

In order to solve the aforementioned problem, the invention proposes a function management method to analyze the mapping relationship between normal functions and API functions and the calling relationship between normal functions, in order to improve the performance of the memory device. In addition, the mapping relationship can be illustrated in a schematic and visual way using the present invention. Accordingly, users and developers can rapidly and efficiently execute various functions of the memory device.

In one aspect of the invention, a function management method for a memory device is provided. The function management method includes obtaining a plurality of functions through a map file of a compiler, and executing parsing for at least one source code of the memory device through the map file. The functions include at least one normal function and at least one application programming interface (API) function. The parsing includes developing a mapping relationship between the at least one API function and the at least one normal function, and developing a calling relationship between the at least one normal function.

In the step of obtaining the functions through the map file, the function management method includes developing a normal function database of the at least one normal function and developing an API function database of the at least one API function. The normal function database records names of the at least one normal function, the quantity of functions which are called by the at least one normal function, the quantity of functions which call the at least one normal function and/or whether the at least one normal function corresponds to the at least one API function or not. The API function database records names of the at least one API function. The map file comprises names of the at least one normal function and the at least one API function for parsing source codes of the API function and the normal function which are utilized by the memory device.

Furthermore, in the step of developing the mapping relationship between the at least one API function and the at least one normal function, function management method includes reading the source code, and determining whether or not one of the at least one API function maps to the at least one the normal function according to the source code. When one of the at least one API function is determined to be mapped to the at least one normal function according to the source code, the normal function and the API function which have a mapping relationship are obtained from the normal function database and the API function database, marking that the normal function is mapped to the API function in the normal function database, and the mapping relationship between the normal function and the API function is recorded in a mapping relationship database.

In the step of developing the calling relationship between the at least one normal function, the function management method includes reading the source code, and obtaining the normal function of the source code from the normal function database according to the source code. When another function which is called by the normal function of the source code is a normal function, the function management method includes recording the calling relationship between the normal function and another normal function which is called by the normal function in a calling relationship database. When another function which is called by the normal function of the source code is an API function, the function management method includes obtaining the normal function which is mapped to the called API function through the mapping relationship database, recording a calling relationship between the normal function and another normal function which is mapped to the API function in the calling relationship database.

In another aspect of the invention, a memory device with function management is provided. The memory device includes a parsing module and a database module. The parsing module is utilized to obtain a plurality of functions through a map file of a compiler, and execute parsing for at least one source code of the memory device through the map file. The functions comprise at least one normal function and at least one application programming interface (API) function. The database module is utilized to develop a mapping relationship between the at least one API function and the at least one normal function, and to develop a calling relationship between the at least one normal function.

Other aspects and features of the present invention will become apparent to those with ordinarily skill in the art upon review of the following descriptions of specific embodiments of the function management method.

BRIEF DESCRIPTION OF DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 2 is a schematic diagram of a number of databases according to an embodiment of the invention;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF THE INVENTION

Figure 1:
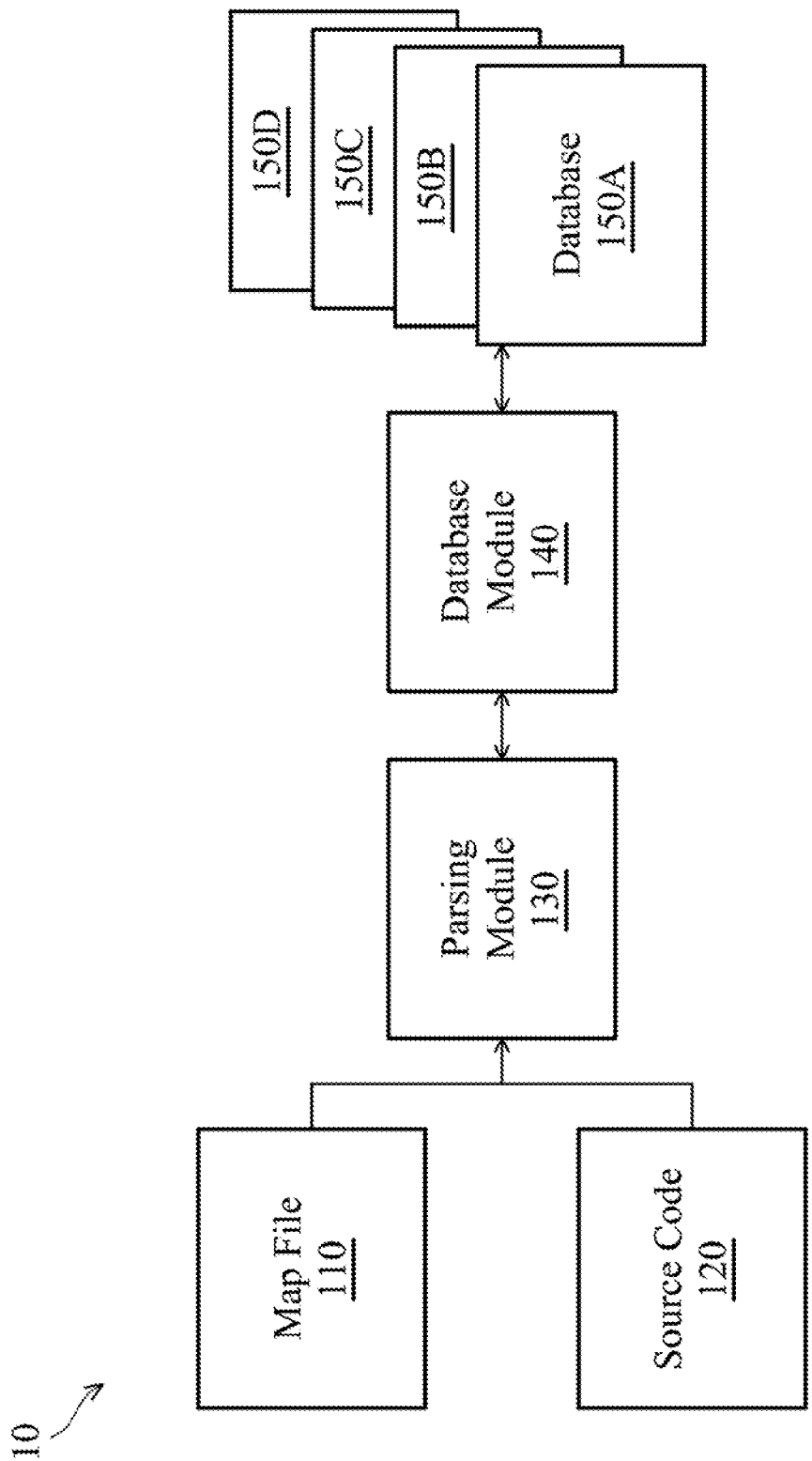
FIG. 1 is a schematic diagram of a memory device according to an embodiment of the invention.

The following disclosure provides many different embodiments, or examples, for implementing different features of the subject matter provided. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a schematic diagram of a memory device 10 according to an embodiment of the invention. The memory device 10 could be random access memory (RAM), read only memory (ROM), a flash, a hard disk, a soft disk or a magnetic memory. As shown in FIG. 1, the memory device 10 includes a map file 110, source code 120, a parsing module 130, a database module 140 and a plurality of databases 150A-150D. The parsing module 130 and the database module 140 could be implemented by circuit, hardware or embedded software codes. The embedded software codes could be accessed and executed by a processor. In addition, the memory device 10 could be arranged in an electronic device. For example, the electronic device could be a mobile electronic device, a tablet computer, a laptop computer or a PDA, or could it be an electronic device such as a desktop computer or a server. Therefore, the memory device 10 could be utilized to record functions and their source codes, which are necessary for all kinds of applications of the electronic device.

In one embodiment, the map file 110 is generated from a compiler. The parsing module 130 receives a plurality of functions through the map file 110, and parses at least one source code 120 of the memory device 10 through the map file 110. Furthermore, The above functions include at least one normal function and at least one application programming interface (API) function. Specifically, an API function is utilized for interleaving and communication, and it does not interrupt execution of the source code 120. Advantages of the API function include that the program developer can replace the source code 120 of the bottom layer by utilizing routine functions. The development could be facilitated accordingly. Unlike the API function, the normal function is real function. An API function could map one or more API functions. Therefore, the mapping relationships between the normal functions and the API functions are recorded and analyzed to enhance the development and improve the performance of the memory device 10.

It should be noted that the map file 110 includes the names of at least one API function and at least one normal function. In one embodiment, the API functions and the normal functions can be distinguished by their names. For example, if the starting part of the name of a function is API, it can be identified as an API function. If the starting part of the name of a function is not API, it can be identified as a normal function. Therefore, by utilizing the map file 110, the parsing module 130 can parse the API function and the normal function which are used by the memory device 10. In one embodiment, it is not necessary to analyze the function which will not be utilized actually. As such, the efficiency of the parsing module 130 of analysis could be increased.

In addition, by utilizing the map file 110, the database module 140 develops at least one normal function database (database 150A) for normal functions and at least one API function database (database 150B) for API functions. FIG. 2 is a schematic diagram of a number of databases 150A~150D according to an embodiment of the invention. As shown in FIG. 2, the normal function database 150A records the indexes of normal functions (the index column), the names of the normal functions (the name column), the quantity of functions which are called by the normal function (the calling column), the quantity of functions which call the normal function (the called column) and/or whether the normal function corresponds to the API function or not (the alternative column). In addition, the API function database 150B records the names of the API functions (the name column).

In the normal function database shown in FIG. 2, each normal function has an index number. For example, the name of the function with index number 122 is ISP_NF_FTL_CleanPart2n3. The function calls three normal functions (the calling column is 3), it is called by six normal functions (the called column is 6), and it has a corresponding API function (the alternative column is 1). Furthermore, the name of the function with index number 124 is ISP_NF_FTL_Erase_Trim_ModeEntry. The function calls one normal function (the calling column is 1), it is called by seven normal functions (the called column is 7), and it does not have a corresponding API function (the alternative column is 0). In addition, the API function database of FIG. 2 records the names of the API functions (the name column). For example, the name of the function with index number 0 is API_CTL_ErrHandle, and the name of the function with index number 1 is API_CTL_FuncSel.

In one embodiment, the first parsing is executed by the parsing module 130 to clarify the mapping relationship between normal functions and API functions. A mapping relationship database (database 150C) between at least one API function and at least one normal function is developed by the database module 140. In the mapping relationship database of FIG. 2, the name of the API function (the name column) and its at least one corresponding normal function (F-index column) are recorded. Each index number represents a mapping relationship. For example, the mapping between the API function with the name of API_NF_FTL_ReportExe and the normal function with number 128 is recorded in the column of index number 0, and the mapping between the API function with the name of API_NF_FTL_ReportExe and the normal function with number 130 is recorded in the column of index number 1. Accordingly, the API function of API_NF_FTL_ReportExe is mapped to a number of normal functions. In addition, the mapping between the API function with the name API_NF_PFTL_Read_SysPage_Retry and the normal function with number 210 is recorded in the column of index number 4. Accordingly, the API function of API_NF_PFTL_Read_SysPage_Retry is mapped to a normal function.

In one embodiment, the second parsing is executed by the parsing module 130 to clarify the calling relationship between the normal functions, and a calling relationship (database 150D) of at least one normal function is developed by the database module 140. The numbers of normal functions are recorded by the calling relationship database of FIG. 2. Each index number represents a calling relationship including the number of the normal function which is called by another normal function and the number of the normal function which is calling another normal function. For example, the column with index number 0 records that normal function number 138 calls normal function number 113, and the column with index number 1 records that normal function number 138 calls normal function number 110, and the column with index number 2 records that normal function number 105 calls normal function number 103. Therefore, normal function number 138 calls two normal functions, and normal function number 105 calls one normal function.

Specifically, when the parsing module 130 determines that one of the API functions is mapped to a normal function, the normal function and the API function with a mapping relationship are obtained from the normal function database 150A and the API function database 150B by the database module 140. Afterwards, the database module 140 marks that the normal function is mapped to the API function in the normal function database 150A, and it records the mapping relationship between the normal function and the API function in the mapping relationship database 150C. In addition, when the parsing module 130 determines that the function which is called by the normal function of the source code 120 is a normal function, the database module 140 records the calling relationship between the normal function and another normal function which is called by the normal function in the calling relationship database 150D.

In addition, when the parsing module 130 determines that the function which is called by the normal function of the source code 230 is a API function, the database module 140 obtains the normal function which is mapped to the called API function through the mapping relationship database 150C, and records the calling relationship between the normal function and the mapped normal function of the API function in the calling relationship database 150D. The memory device 10 and its function management method of the present invention could analyze the mapping relationship between normal functions and API functions, and analyze the calling relationship between the normal functions. Therefore, it will be convenient to mange the memory device 10, and the performance of the memory device 10 could be improved.

Figure 3:
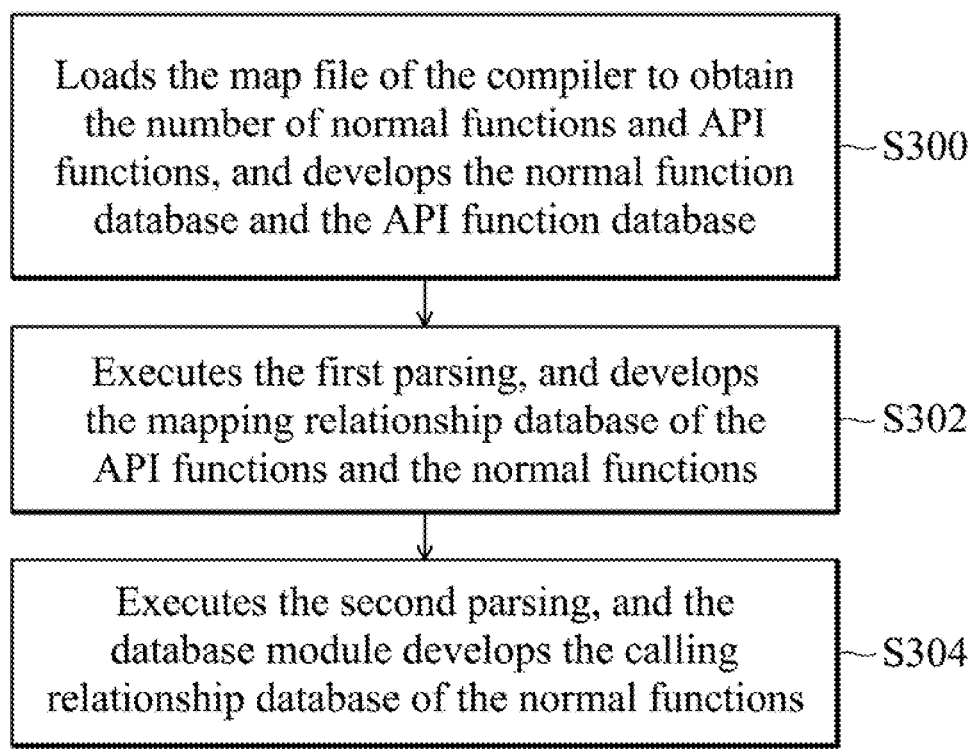
FIG. 3 is a flowchart of a function management method according to an embodiment of the invention.

FIG. 3 is a flowchart of a function management method according to an embodiment of the invention. In step S300, the parsing module 130 loads the map file 110 of the compiler to obtain the number of normal functions and API functions, and the database module 140 develops the normal function database 150A and the API function database 150B. In step S302, the parsing module 130 executes the first parsing, and the database module 140 develops the mapping relationship database 150C of the API functions and the normal functions according to the results of the first parsing. Afterwards, in step S304, the parsing module 130 executes the second parsing, and the database module 140 develops the calling relationship database 150D of the normal functions according to the results of the second parsing. It should be noted that the above databases 150A-150D relate to each other and are updated dynamically. When a calling relationship of normal functions is added by the calling relationship database 150D, the value of the calling column or the called column of the normal function will be updated accordingly in the normal function database 150A.

Figure 4:
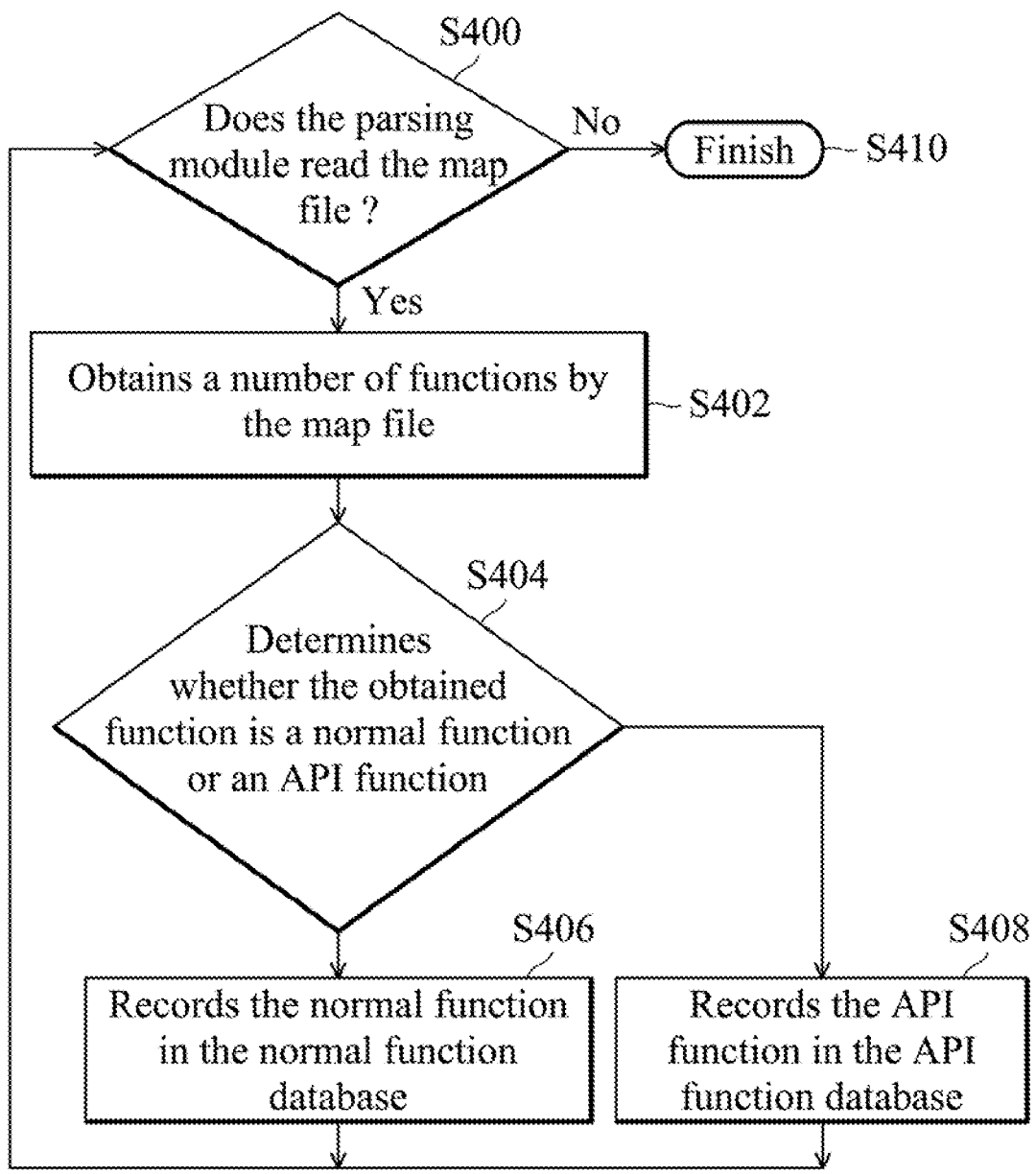
FIG. 4 is a flowchart of loading map file according to an embodiment of the invention.

FIG. 4 is a flowchart of loading a map file according to an embodiment of the invention. In step S400, whether the parsing module 130 reads the map file 110 or not is determined. If the parsing module 130 does not read the map file 110, step S410 is executed to finish the flow. If the parsing module 130 reads the map file 110, step S402 will be executed so that the parsing module 130 obtains a number of functions by the map file 110. Afterwards, in step S404, the parsing module 130 determines whether the obtained function is a normal function or an API function. If the parsing module 130 determines that the obtained function is a normal function, step S406 will be executed so that the database module 140 records the normal function in the normal function database 150A, and the flow finishes. If the parsing module 130 determines that the obtained function is an API function, step S408 will be executed so that the database module 140 records the API function in the API function database 150B, and the flow finishes.

Figure 5:
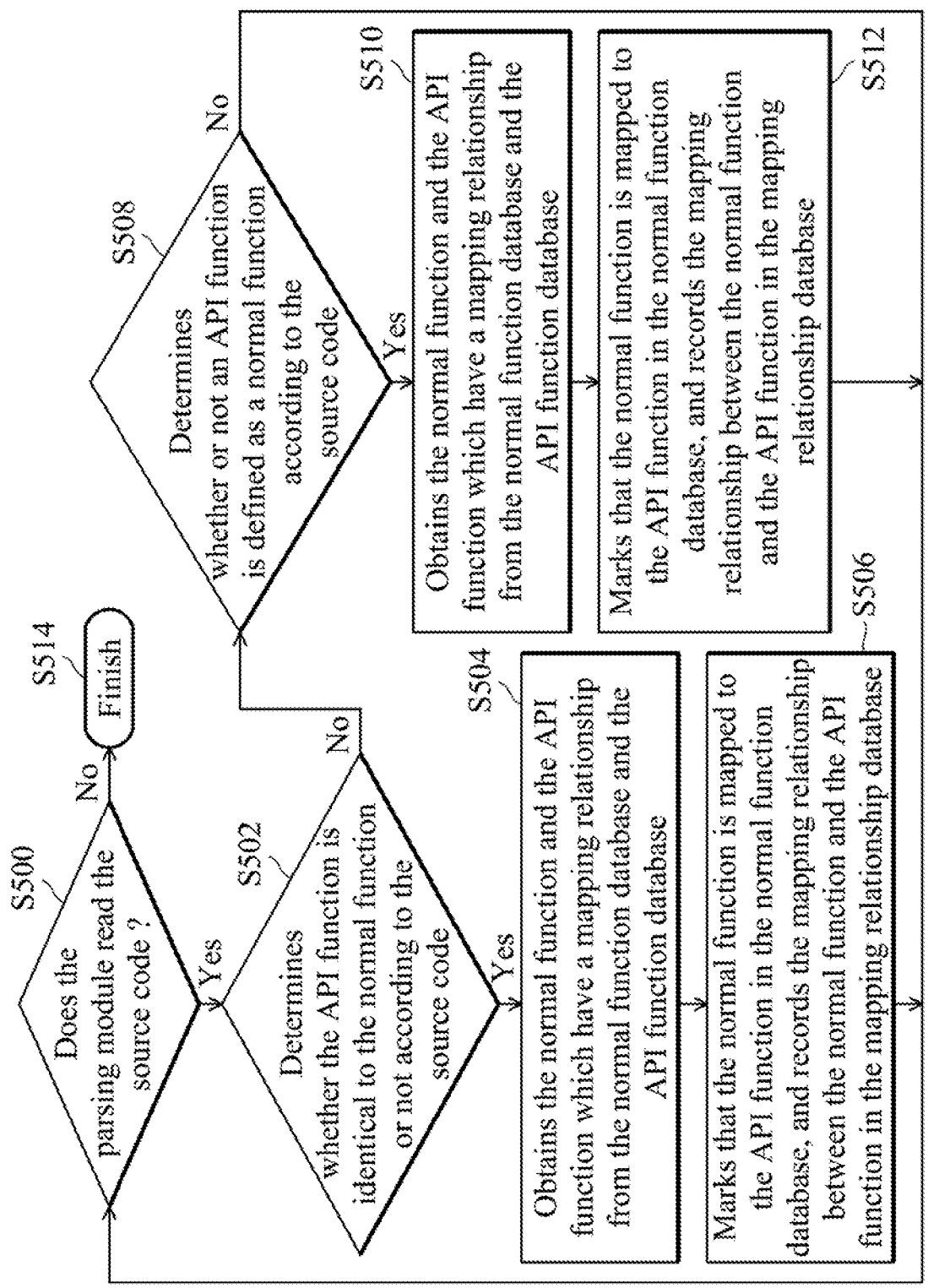
FIG. 5 is a flowchart of first parsing according to an embodiment of the invention.

FIG. 5 is a flowchart of first parsing according to an embodiment of the invention. In step S500, whether the parsing module 130 reads the source code 120 or not is determined. If the parsing module 130 does not read the source code 120, step S514 is executed to finish the flow. If the parsing module 130 reads the source code 120, step S502 will be executed so that the parsing module 130 determines whether the API function is identical to the normal function or not according to the source code 120. Specifically, when the source code 120 includes the symbol "=", it could be determined that the API function is identical to the normal function. Afterwards, step S504 is executed. In step S504, the database module 140 obtains the normal function and the API function which have a mapping relationship from the normal function database 150A and the API function database 150B. Afterwards, step S506 is executed so that the database module 140 marks that the normal function is mapped to the API function in the normal function database 150A, and records the mapping relationship between the normal function and the API function in the mapping relationship database 150C. Afterwards, step S500 is executed again.

In addition, in step S502, if the parsing module 130 determines that the API function is not identical to the normal function according to the source code 120, which means that there is no API function mapped to the normal function, step S508 will be executed. In step S508, the parsing module 130 determines whether or not an API function is defined as a normal function according to the source code 120. Specifically, if the source code 120 includes the symbol "#define", it could be determined that the API function is mapped to the normal function. Afterwards, step S510 will be executed. If the parsing module 130 determines that the API function is not defined as the normal function according to the source code 120, step S500 will be executed. In step S510, the database module 140 obtains the normal function and the API function which have a mapping relationship from the normal function database 150A and the API function database 150B. Afterwards, step S512 is executed so that the database module 140 marks that the normal function is mapped to the API function in the normal function database 150A, and records the mapping relationship between the normal function and the API function in the mapping relationship database 150C. Afterwards, step S500 will be executed again. By utilizing the first parsing executed by the parsing module 130, the mapping relationship between the API function and the normal function could be clarified to develop the mapping relationship database 150C in a schematic and visual way. Accordingly, research can be facilitated to improve performance.

Figure 6:
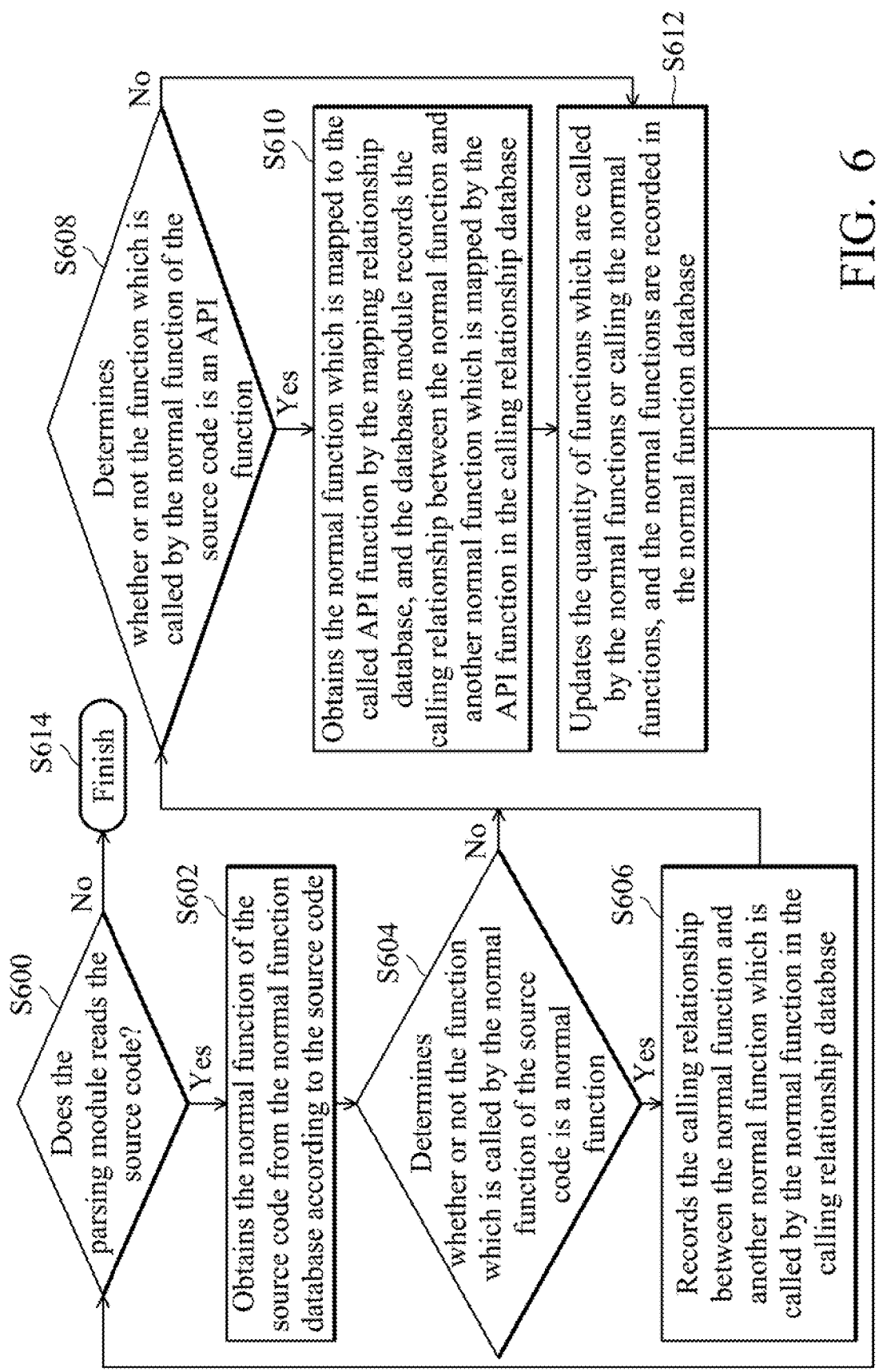
FIG. 6 is a flowchart of second parsing according to an embodiment of the invention.

FIG. 6 is a flowchart of second parsing according to an embodiment of the invention. In step S600, whether the parsing module 130 reads the source code 120 or not is determined. If the parsing module 130 does not read the source code 120, step S614 will be executed to finish the flow. If the parsing module 130 reads the source code 120, step S602 will be executed so that the parsing module 130 obtains the normal function of the source code 120 from the normal function database 150A according to the source code 120. Afterwards, step S604 is executed so that the parsing module 130 determines whether or not the function which is called by the normal function of the source code 120 is a normal function.

In one embodiment, if the parsing module 130 determines that the function which is called by the normal function of the source code 120 is a normal function, step S606 will be executed so that the database module 140 records the calling relationship between the normal function and another normal function which is called by the normal function in the calling relationship database 150D. Afterwards, step S608 will be executed. If the parsing module 130 determines that the function which is called by the normal function of the source code 120 is not a normal function, step S608 will be executed. In step S608, the parsing module 130 determines whether or not the function which is called by the normal function of the source code 120 is an API function. If the parsing module 130 determines that the function which is called by the normal function of the source code 120 is an API function, step S610 is executed. In step S610, the parsing module 130 obtains the normal function which is mapped to the called API function by the mapping relationship database 150C, and the database module 140 records the calling relationship between the normal function and another normal function which is mapped by the API function in the calling relationship database 150D.

Afterwards, step S612 is executed so that the database module 140 updates the quantity of functions which are called by the normal functions or calling the normal functions, and the normal functions are recorded in the normal function database 150A. Furthermore, in step S608, if the parsing module 130 determines that the function which is called by the normal function of the source code 120 is not an API function, step S612 will be executed. By utilizing the second parsing of the function management method which is executed by the parsing module 130 of the present invention, the calling relationship between the normal functions could be clarified. Afterwards, the calling relationship database 150D is developed by the database module 140 in a schematic and visual way. Accordingly, research for the memory device 10 can be facilitated to improve performance.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A function management method for a memory device, comprising:
   generating, by a compiler, a map file according to program codes loaded from the memory device;
   loading, by a processor, the map file from the compiler;
   obtaining, by the processor, a plurality of functions through the map file of the compiler, wherein the functions comprise at least one normal function and at least one application programming interface (API) function, and the map file comprises names of the normal function and the API function, wherein the function which is not be utilized actually is not analyzed;
   distinguishing, by the processor, the normal function and the API function according to the names;
   loading, by the processor, at least one source code from the memory device;
   executing, by the processor, parsing for the at least one source code of the memory device through the map file;
   determining, by the processor, whether or not one of the at least one API function is identical to or is defined as the at least one normal function according to a symbol of the source code to develop a mapping relationship between the at least one API function and the at least one normal function in the memory device;
   determining, by the processor, whether or not another function which is called by the normal function of the source code is a normal function or a API function through the mapping relationship to develop a calling relationship between the at least one normal function in the memory device; and
   recording, by the processor, quantity of functions which are called by the normal function, quantity of functions which call the normal function and/or whether the normal function corresponds to the API function or not in the memory device;
   when one of the functions which are called by the normal function is neither the normal function nor the API function, updating, by the processor, the quantity of functions which are called by the normal functions and calling the normal functions to confirm the calling relationship in the memory device, and recording, by the processor, the normal functions in a normal function database of the memory device.

2. The function management method as claimed in claim 1, wherein in the step of obtaining the functions through the map file, further comprising developing the normal function database of the at least one normal function of the memory device and developing an API function database of the at least one API function of the memory device.

3. The function management method as claimed in claim 2, wherein the normal function database of the memory device records name of the at least one normal function, the quantity of functions which are called by the at least one normal function, the quantity of functions which call the at least one normal function and/or whether the at least one normal function maps to the at least one API function or not, and the API function database of the memory device records name of the at least one API function.

4. The function management method as claimed in claim 2, wherein when one of the at least one API function is determined to being identical to or being defined as the at least one normal function according to the source code, obtaining the normal function and the API function which have the mapping relationship from the normal function database of the memory device and the API function database of the memory device, marking that the normal function maps to the API function in the normal function database of the memory device, and recording the mapping relationship between the normal function and the API function in a mapping relationship database of the memory device.

5. The function management method as claimed in claim 4, wherein in the step of developing the calling relationship between the at least one normal function, further comprising reading the source code, and obtaining the normal function of the source code from the normal function database of the memory device according to the source code.

6. The function management method as claimed in claim 5, wherein when another function which is called by the normal function of the source code is the normal function, recording the calling relationship between the normal function and another normal function which is called by the normal function in a calling relationship database of the memory device.

7. The function management method as claimed in claim 6, wherein when another function which is called by the normal function of the source code is not a normal function, determining that another function which is called by the normal function of the source code is an API function.

8. The function management method as claimed in claim 7, wherein when another function which is called by the normal function of the source code is the API function, obtaining the normal function which is mapped to the called API function through the mapping relationship database of the memory device, recording a calling relationship between the normal function and another normal function which is mapped to the API function in the calling relationship database of the memory device.

* * * * *